United States Patent [19]

Shirata et al.

[11] Patent Number: 5,019,897
[45] Date of Patent: May 28, 1991

[54] SCANNING APPARATUS FOR READING A COLOR IMAGE

[76] Inventors: Atsushi Shirata; Kiyosuke Suzuki, both of c/o Sony Corporation, 7-35 Kitashinagawa, 6-chome, Shinagawa-ku, Tokyo, Japan

[21] Appl. No.: 374,055

[22] Filed: Jun. 30, 1989

[30] Foreign Application Priority Data

Jul. 7, 1988 [JP] Japan .................................. 63-169876

[51] Int. Cl.$^5$ ...................... H04N 1/46; H04N 1/28; G03F 3/8
[52] U.S. Cl. ........................................ 358/75; 358/80
[58] Field of Search ..................................... 358/75, 80

[56] References Cited

U.S. PATENT DOCUMENTS 4,458,264 7/1984 Tamura .
4,926,253 5/1990 Nakashima et al. .................. 358/75

FOREIGN PATENT DOCUMENTS 0025473 1/1984 Japan ..................................... 358/75

Primary Examiner—James J. Groody
Assistant Examiner—Michael H. Lee
Attorney, Agent, or Firm—Lewis H. Eslinger

[57] ABSTRACT

There is provided a color image reading apparatus in which a directivity is given to the light emitted from a non-directinal light source and when the reading position changes, the reflected light of the light emitted from the non-directional light source is reduced in substantially the same manner as the reflected light of the light emitted from a directional light source, thereby preventing the color tone deviation which occurs because the directional light source and non-directional light source are mixedly provided.

7 Claims, 4 Drawing Sheets

Fig. 5A  RED 
Fig. 5B  GREEN 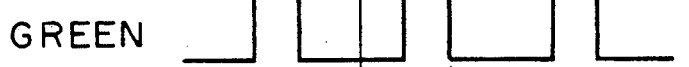
Fig. 5C  BLUE 
Fig. 6
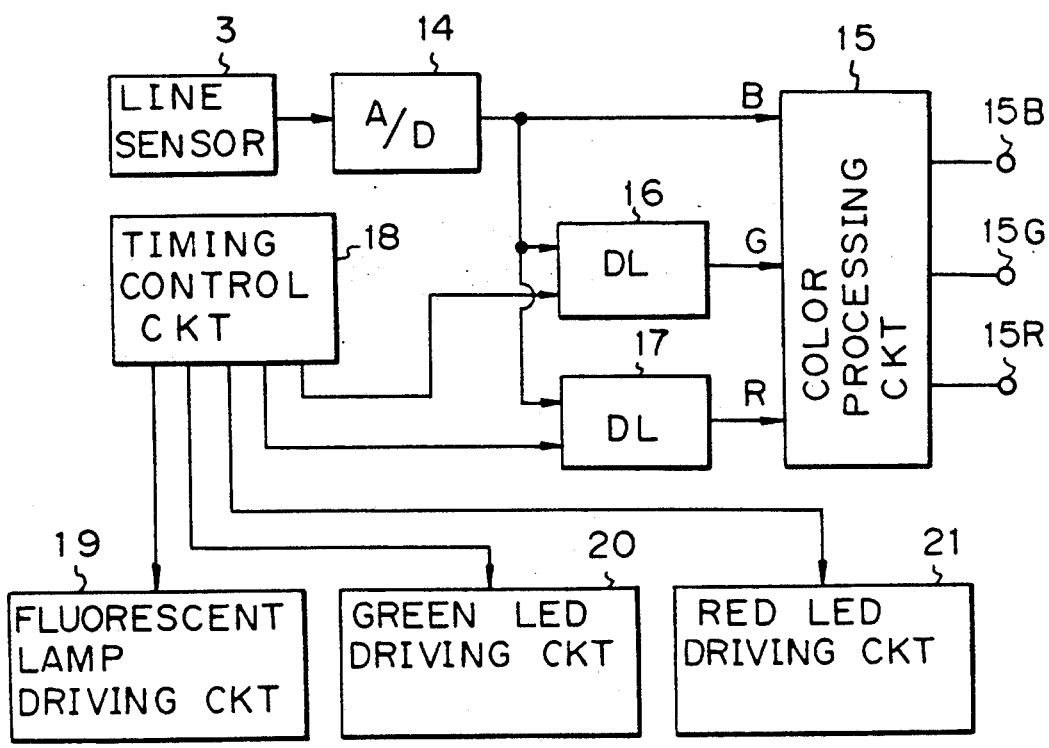

SCANNING APPARATUS FOR READING A COLOR IMAGE

BACKGROUND OF THE INVENTION

1. Field of the Invention

The present invention relates to a color image reading apparatus which is used in a color image transmitting apparatus, a color image copying apparatus, or the like.

2. Description of the Prior Art

A color image reading apparatus using a plurality of light sources having different spectrum characteristics has been proposed as a color image transmitting apparatus or a color image copying apparatus. As the light sources of a plurality of colors, for instance, there are used a red light source to selectively irradiate a red wavelength component, a green light source to selectively irradiate a green wavelength component, and a blue light source to selectively irradiate a blue wavelength component.

A fluorescent lamp has conventionally been used as a light source of each color to irradiate such wavelength components. Although the amount of light from the fluorescent lamp is large, in general, the flickering response speed is bad. Among the fluorescent lamps, the flickering response speed of the fluorescent lamp to emit the red light is particularly bad. Another drawback is that electric power consumption is large. Therefore, when the fluorescent lamp is used as a light source, there are limitations in realizing a high reading speed and to reduced the electric power consumption.

To solve such a problem, there has been proposed a color image reading apparatus in which a light emitting diode is used in place of a fluorescent lamp with respect to the light source having a slow flickering response speed. Thus, a fluorescent lamp and a light emitting diode are mixedly used as light sources of three colors, thereby making the reading speed high and reducing the electric power consumption (JP-A No. 60-130964).

FIG. 1 is a cross sectional view of a conventional color image reading apparatus in which a light emitting diode and a fluorescent lamp are mixedly used as light sources. In the color image reading apparatus, a reading section 2 is arranged near a glass plate 7 on which an original 1 onto which a color image is drawn by printing or the like is placed. A CCD line sensor 3 having a photo sensitive section 3a which faces the original 1 is attached to the reading section 2. The photo sensitive section 3a has a length corresponding to the width of the original 1. A multi-lens array 4 in which a plurality of rod-shaped lenses are arranged in a line is located between the photo sensitive section 3a of the CCD line sensor 3 and the original 1. The reflected light from one line, that is, a detected line l in the width direction of the original 1 is incident upon the photo sensitive section 3a of the CCD line sensor 3 through the multi-lens array 4.

A fluorescent lamp 5 having a length corresponding to the width of the original 1 is arranged near a side surface of the multi-lens array 4. A blue light is irradiated to the original 1 by the light emission of the fluorescent lamp 5. A light emitting diode unit 6 of the length W corresponding to the width of the original 1 is arranged near the side surface of the multi-lens array 4 on the side opposite to the fluorescent lamp 5. As shown in FIG. 3, according to the light emitting diode (hereinafter, simply referred to as the LED) unit 6, red LEDs 6R and green LEDs 6G are alternately arranged in a line on a base plate 6a. The LEDs 6R and 6G are covered by a rod lens 6b shown by an alternate long and short dash line.

Therefore, the red light and green light emitted from the red and green LEDs 6R and 6G are converged by the rod lens 6b and become the directional lights, thereby concentratedly irradiating the reading position of the original 1. On the other hand, the blue light from the fluorescent lamp 5 is irradiated to a wide range of the original 1 since it is the dispersive light.

When the original 1 is read, the respective color lights are time-sharingly irradiated. Every time each color light is irradiated, the reflected light from the original 1 is detected by the photo sensitive section 3a of the CCD line sensor 3 and is photoelectrically converted into an electric signal. The electric signals of the respective colors are simultaneously supplied to a color processing circuit through delay circuits. Three primary color signals of red, green, and blue corresponding to the mixture ratios of the respective color signals are formed, thereby obtaining color image signals.

When the LED unit 6 as a directional light source and the fluorescent lamp 5 as a non-directional light source are mixedly provided, there is a drawback such that if the original 1 floats over the glass plate 7, a color tone deviation occurs.

That is, for instance, when the original 1 has a crease or the like, the original 1 floats over the glass plate 7 as shown in a cross sectional view of FIG. 2. Since the LED unit 6 is the directional light source as mentioned above, the red and green lights from the LED unit 6 are concentratedly irradiated from the oblique lower position to the detected line % in a state in which the original 1 is in contact with the glass plate 7. Therefore, when the position of the detected line l is moved upward due to the floating of the original 1, the red and green lights are not sufficiently irradiated to the detected line Z. Thus, the reflected lights of the red and green lights which enter the CCD line sensor 3 remarkably decrease.

On the other hand, since the fluorescent lamp 5 is the non-directional light source, the blue light from the fluorescent lamp 5 is sufficiently irradiated to the detected line l even when the original 1 is floating. Therefore, the blue light which is reflected by the detected line l and enters the CCD line sensor 3 is not so largely reduced even if the original floats. Consequently, when the directional light source and the non-directional light source are mixedly provided, if the original 1 floats, the ratio of the reflected light of the light emitted from the non-directional light source is relatively high, so that there is a drawback such that the color tone deviation occurs and the color reproduction which is accurate to the original cannot be realized.

OBJECTS AND SUMMARY OF THE INVENTION

In consideration of the above problems, it is an object of the invention to prevent the color tone deviation which occurs because a directional light source and a non-directional light source are mixedly provided.

According to the present invention, this object is accomplished by a scanning apparatus for reading a color image comprising: light means for emitting lights to a detected line of an original, said light means including a plurality of color light sources having a first source of light to emit a directional light and a second source of light to emit a non-directional light; control means for sequentially switching lighting operations of said color light sources; a photoelectric transferring device for receiving the light reflected by said detected line of the original; and optical means, arranged between said second source of light and said detected line of the original, for giving a directivity to said second source of light.

Since the directivity is given to the light emitted from the non-directional light source 5, when the position of the original 1 changes, the reflected light of the light emitted from the non-directional light source 5 decreases in a manner similar to the case of the reflected light of the light emitted from the directional light source 6. Therefore, even if the position of the detected line 1 changes, the ratio of the reflected lights 8b, 9b, and 10b of the respective colors reflected by the detected line 1 hardly changes. The color tone deviation which occurs because the directional light source 6 and the non-directional light source 5 are mixedly provided is prevented.

The above and other objects, features, and advantages of the present invention will become readily apparent from the following detailed description thereof which is to be read in connection with the accompanying drawings.

BRIEF DESCRIPTION OF THE DRAWINGS

FIGS. 5A to 5C are drive waveform diagrams of light sources;

FIG. 6 is a block diagram of a signal processing circuit;

DETAILED DESCRIPTION OF THE PREFERRED EMBODIMENTS

Figure 1:
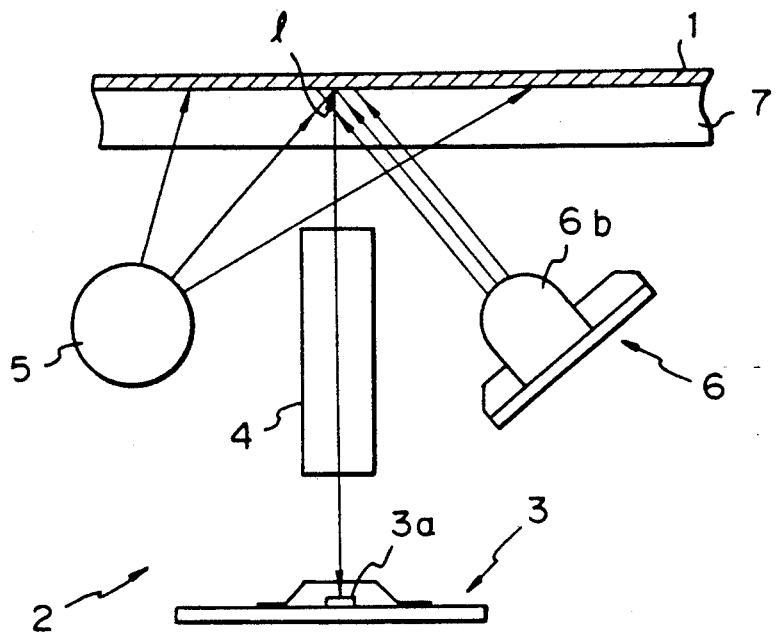
FIGS. 1 and 2 are cross sectional views of the main section of a conventional color image reading apparatus.
Figure 2:
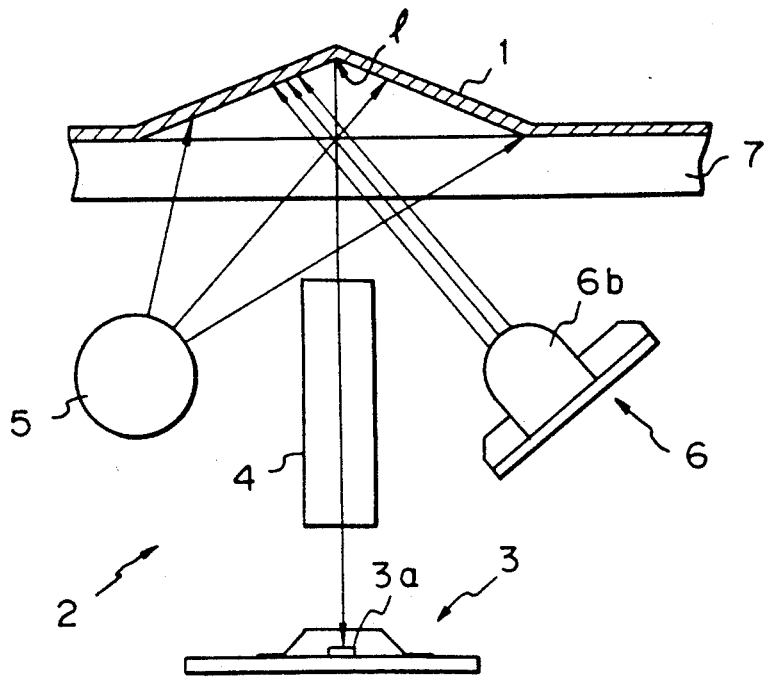
Figure 3:
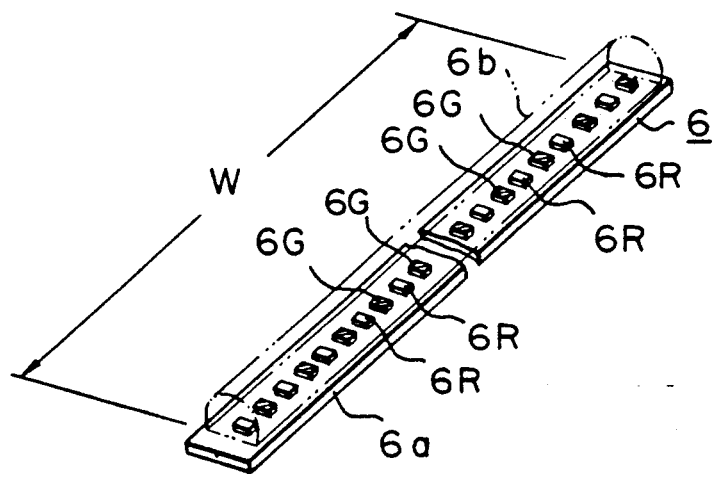
FIG. 3 is a perspective view of a light emitting diode unit.
Figure 4:
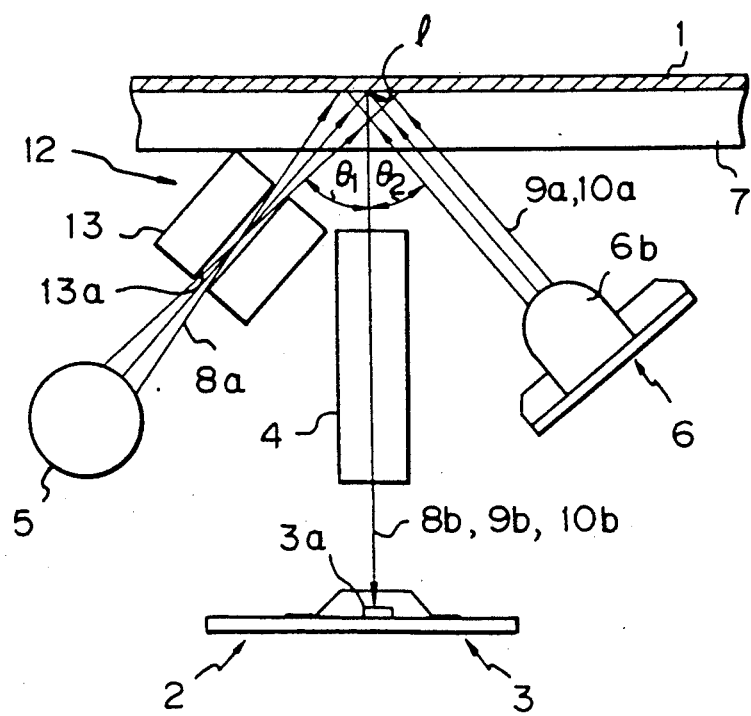
FIG. 4 is a cross sectional view of the main section of a color image reading apparatus showing an embodiment of the present invention.

FIG. 4 is a cross sectional view of the main section of a color image reading apparatus showing an embodiment of the present invention. In FIG. 4, the same parts and components as those shown in FIG. 1 are designated by the same reference numerals and their detailed descriptions are omitted.

As shown in FIG. 4, in the color image reading apparatus of the embodiment, optical means 12 for giving a directivity to a blue light 8a emitted from the fluorescent lamp 5 is arranged between the fluorescent lamp 5 as a non-directional light source and the original 1. In the embodiment, a slit plate 13 having a slit 13a is provided as the optical means 12. Therefore, the blue light 8a emitted from the fluorescent lamp 5 is shut off by the slit plate 13 and only the blue light 8a which passed through the slit 13a has the directivity near the parallel light and is irradiated onto the original 1.

The position and size of the slit 13a are set in a manner such that the irradiating position of the blue light 8a coincides with the irradiating positions of a red light 9a and a green light 10a which are emitted from the light emitting diode (LED) unit 6 as a directional light source, that is, the blue light 8a irradiates the detected line 1 of the original 1.

The fluorescent lamp 5, slit plate 13, LED unit 6, and the like are arranged in a manner such that an angle $\theta_1$ at which the blue light 8a irradiates the detected line 1 substantially coincides with an angle $\theta_2$ at which the red light 9a and green light 10a irradiate the detected line 1. Therefore, even when the directional light source 6 and the non-directional light source 5 are mixedly provided, the characteristics of the emitted lights 8a, 9a, and 10a, that is, the irradiating areas, irradiating positions, irradiating angles, and the like can be almost equalized. It is not always necessary to equalize the irradiation light amounts.

When a color image on the detected line 1 is read by the CCD line sensor 3, the irradiation of the red light 9a by a plurality of red LEDs 6R, the irradiation of the green light 10a by a plurality of green LEDs 6G, and the irradiation of the blue light 8a by the fluorescent lamp 5 are time-sharingly executed. Referring to FIGS. 5A to 5C showing irradiating states of the respective colors, the irradiation of the red light (corresponding to the high level signal in FIG. 5A), the irradiation of the green light (corresponding to the high level signal in FIG. 5B), and the irradiation of the blue light (corresponding to the high level signal in FIG. 5C) are time-sharingly repetitively executed under the control of a timing control circuit 18 (refer to FIG. 6), which will be explained hereinlater. The irradiation of the blue light 8a by the fluorescent lamp 5 is executed for a slightly longer time than those of the other colors because the fluorescent lamp 5 has a slight afterglowing time in terms of its characteristic.

In this manner, the red light 9a, green light 10a, and blue light 8a are time-sharingly sequentially irradiated onto the detected line 1 of the original 1. Reflected lights 8b, 9b, and 10b from the detected line 1 are detected by the CCD line sensor 3 and photoelectrically converted into electric signals. Therefore, color images of three colors can be read from every line. After completion of the reading operation of one line, the CCD line sensor 3 or original 1 is moved by only one line and the next line is read. By executing such a reading operation with respect to all of the lines of one picture plane, a color image of one picture plane drawn on the original 1 can be read.

FIG. 6 shows a circuit construction to process an output signal of the CCD line sensor 3. As shown in FIG. 6, the output signal as image information of the CCD line sensor 3 is digitized by an analog/digital (A/D) converter 14. The digital signal output from the A/D converter 14 is directly supplied to a color processing circuit 15 and is supplied through a first delay circuit 16 and is also supplied through a second delay circuit 17. In this case, the delay times of the first and second delay circuits 16 and 17 are controlled by the timing control circuit 18. The timing control circuit 18 controls the light emitting operations of the fluorescent lamp 5 and LEDs 6G and 6R as shown by the states of FIGS. 5A to 5C as mentioned above through a fluorescent lamp driving circuit 19, a green LED driving circuit 20, and a red LED driving circuit 21, respectively. The first delay circuit 16 delays the input signal by a time $t_1$ (refer to FIGS. 5A to 5C) from the irradiation of the green light to the irradiation of the blue light under the control of the timing control circuit 18 and supplies the delayed signal to the color processing circuit 15. On the other hand, the second delay circuit 17 delays the input signal by a time $t_2$ (refer to FIGS. 5A to 5C) from the irradiation of the red light to the irradiation of the blue light under the control of the timing control circuit 18 and supplies the delayed signal to the color processing circuit 15.

By supplying the signals to the color processing circuit 15 as mentioned above, an output signal B of the CCD line sensor 3 upon irradiation of the blue light, an output signal G of the CCD line sensor 3 upon irradiation of the green light, and an output signal R of the CCD line sensor 3 upon irradiation of the red light are simultaneously supplied to the color processing circuit 15 for every line.

On the basis of the ratio of the color signals which are simultaneously supplied to the color processing circuit 15 through delay circuits 16 and 17, the color processing circuit 15 outputs three primary color signals of red, green, and blue signals under preset conditions. The red, green, and blue signals are output from a red signal output terminal 15R, a green signal output terminal 15G, and a blue signal output terminal 15B, respectively, thereby obtaining color image signals as primary color signals.

Since the three primary color signals are made on the basis of the ratio of the light amounts of the blue reflected light 8b, red reflected light 9b, and green reflected light 10b entering the CCD line sensor 3, when the original 1 floats over the glass plate 7, if the light amount ratio changes, the color tone deviation occurs.

Figure 7:
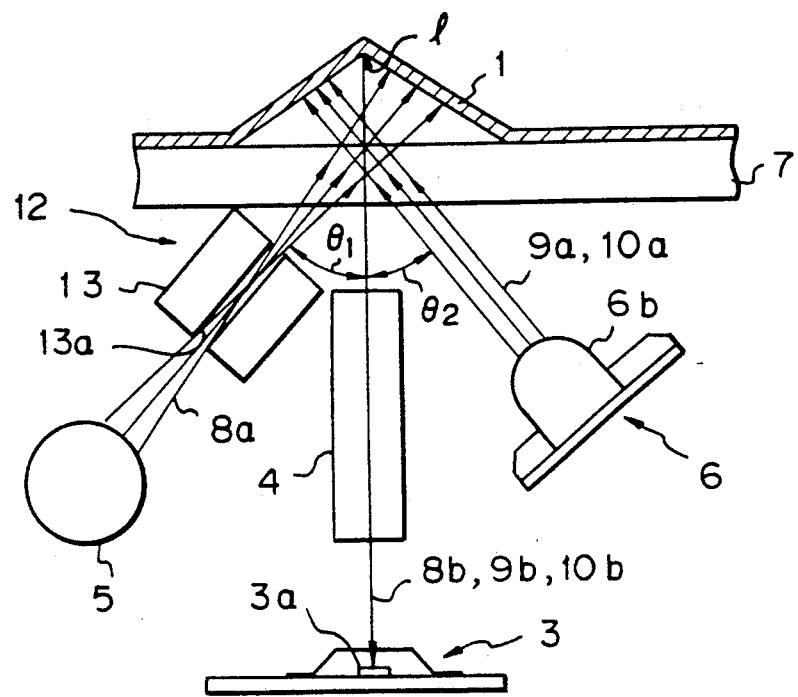
FIG. 7 is a cross sectional view of the main section of the color image reading apparatus showing a state in which an original is floating over a glass plate.

As mentioned above, in this embodiment, the slit plate 13 is arranged between the fluorescent lamp 5 and the original 1, thereby giving directivity to the blue light 8a emitted from the fluorescent lamp 5. Therefore, as shown in FIG. 7, when the original 1 floats, the directivity of the blue light 8a emitted from the fluorescent lamp 5 causes indirect irradiation of the detected line l similar to the indirect irradiation by the red light 9a and green light 10a emitted from the LED unit 6. Therefore, when the original 1 floats, the light amount of the blue reflected light 8b which enters the CCD line sensor 3 decreases in a manner similar to the cases of the red reflected light 9b and green reflected light 10b. Consequently, although the light reception amounts decrease and it becomes dark, it is possible to prevent the ratio of the reflected lights from large changes. Thus, the color tone deviation which occurs because the directional light source 6 and non-directional light source 5 are mixedly provided can be prevented.

A fluorescent light emitting source such as an electroluminescence lamp (EL) panel can be also used as a non-directional light source. It is also possible to construct such that the light emitting diode emits a light of one color and the fluorescent light emitting source emits lights of two colors.

Figure 8:
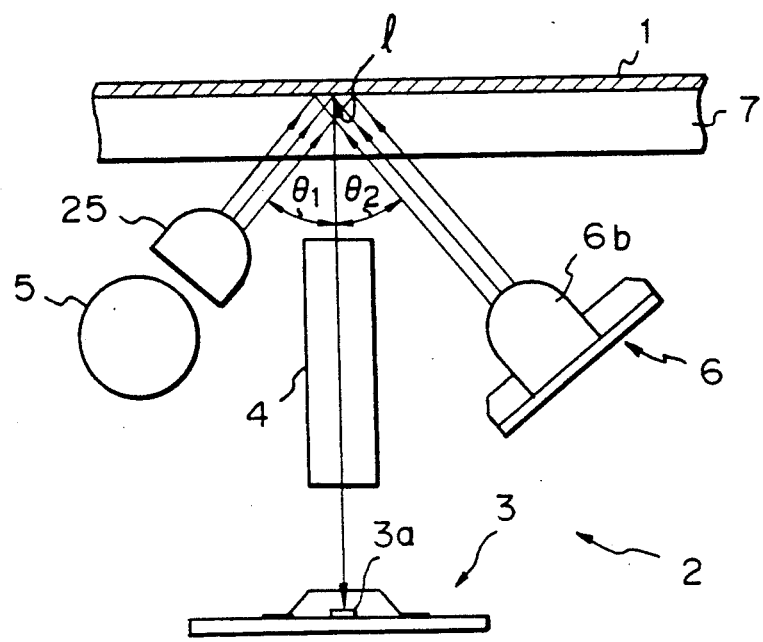
FIG. 8 is a cross sectional view of the main section of a color image reading apparatus showing another embodiment different from FIG. 4.

As shown in FIG. 8, a rod lens 25 may be also used as the optical means 12 for giving the directivity to the light emitted from the non-directional light source. By using the rod lens 25, the amount of light which irradiates the original 1 is larger than that in the case of using the slit plate 13.

As mentioned above, according to the invention, the non-directional light source and directional light source are mixedly provided as a multi-color light source to irradiate a reading position on an original surface. The directivity is given to the light emitted from the non-directional light source and the reading position is irradiated. Therefore, when the reading position is changed, the proportion of light from the non-directional light source which is reflected by the reading position and enter the photo sensitive device can be reduced in substantially the same proportion as the light from the directional light source. Thus, a change in light amount ratio of the color lights which enter the photo sensitive device due to a change in reading position can be prevented. The color tone deviation which occurs because the directional light source and non-directional light source are mixedly provided can be eliminated.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A scanning apparatus for properly reading a color image of an original, even when said original is not perfectly flat, comprising:

light means for emitting light to a detected line of the original, said light including a plurality of color light sources having a first source of light having a length substantially equal to the width of he original for emitting a directional light corresponding to first and second colors and a second source of light having a length substantially equal to the width of the original for emitting a non-directional light corresponding to a third color;

control means for sequentially switching lighting operations of said first and second color light sources;

a photoelectric transferring device for receiving a reflected light, said reflected light being reflected from said detected line of the original; and slit plate means arranged between said second source of light and said detected line of the original, for giving a directivity to said second source of light.

2. An apparatus according to claim 1, wherein said first source of light includes a light emitting device and said second source of light includes fluorescent means.

3. An apparatus according to claim 2, wherein said first source of light includes a red LED and a green LED and said second source of light includes a blue fluorescent light.

4. An apparatus according to claim 3, wherein said first source of light is a light emitting diode unit comprising a plurality of red LEDs and a plurality of green LEDs which are arranged in a straight line on a base plate.

5. An apparatus according to claim 1, wherein said photoelectric transferring device is a line sensor having a length approximately the same as a width of the original.

6. An apparatus according to claim 1, further comprising a multi-lens array through which said reflected light is supplied to said photoelectric transferring device.

7. An apparatus according to claim 1, wherein said light means and said optical means are arranged in a manner such that the directional light emitted from the first source of light and the non-directional light emitted from the second source of light are irradiated to said detected line of the original at an approximately same angle.

* * * * *

UNITED STATES PATENT AND TRADEMARK OFFICE
CERTIFICATE OF CORRECTION

PATENT NO. : 5,019,897
DATED : May 28, 1991
INVENTOR(S) : Atsushi Shirata, Kiyosuke Suzuki It is certified that error appears in the above-identified patent and that said Letters Patent is hereby corrected as shown below:

```
In the abstract, line 4, change "non-directinal" to
--non-directional--
Col. 1, line 32, delete "to"
Col. 2, line 33, change "%" to --1--
        line 38, change "Z" to --1--

In the Claims:

Col. 6, line 25, after "light" insert --means--
        line 27, change "he" to --the--
```

Signed and Sealed this

Fifteenth Day of December, 1992

*Attest:*

DOUGLAS B. COMER

*Attesting Officer*          Acting Commissioner of Patents and Trademarks